United States Patent Office

3,560,465
Patented Feb. 2, 1971

3,560,465
PREPARATION OF SOLUBLE POLY(VINYL ESTERS) FROM HIGH MOLECULAR WEIGHT ACID CHLORIDES
George A. Reynolds, Rochester, N.Y., assignor to Eastman Kodak Company, Rochester, N.Y.
No Drawing. Filed Apr. 1, 1969, Ser. No. 812,380
Int. Cl. C08f 27/12
U.S. Cl. 260—91.3                      10 Claims

ABSTRACT OF THE DISCLOSURE

A process is described for preparing soluble poly(vinyl esters) from poly(vinyl alcohol) and high molecular weight acid chlorides. This procedure is especially useful for preparing light-sensitive polymers.

---

This invention relates to a process for preparing poly(vinyl esters). In a particular aspect is relates to a process for preparing soluble poly(vinyl esters) from poly(vinyl alcohol) and high molecular weight acid chlorides. In a further aspect it relates to a process for preparing soluble light-sensitive poly(vinyl esters).

Poly(vinyl esters) are generally prepared by addition of an acid chloride to a suspension of poly(vinyl alcohol) in a tertiary amine solvent such as pyridine. If the resultant poly(vinyl ester) is to be used in coating operations, where it is desirable to dissolve the polymer in a solvent, the success of the esterification reaction is dependent on the formation of a soluble polymer. When lower molecular weight acid chlorides are utilized to esterify poly(vinyl alcohol), the two-phase system gradually reacts on addition of the acid chloride to the poly(vinyl alcohol) suspension and the insoluble poly(vinyl alcohol) dissolves to give a homogeneous reaction mixture. However, it is found that when higher molecular weight acid chlorides are employed to esterify poly(vinyl alcohol) a homogeneous reaction mixture does not form, even after extended reaction periods, and isolation of the polymer yields an insoluble product.

One method which has been employed to overcome this problem and obtain a soluble poly(vinyl ester) involves the use of a partially acetylated poly(vinyl alcohol) which is pyridine soluble. However, when high molecular weight acid chlorides are employed, this method suffers from the disadvantage that a relatively high acetyl content is necessary to confer pyridine solubility, and, as a result, the remaining hydroxyl groups in the poly(vinyl alcohol) have decreased reactivity due to steric crowding by the acetate groups which are present. Thus, when the high molecular weight acid chloride employed is one which will give a light-sensitive poly(vinyl ester), the light sensitivity of the resultant poly(vinyl ester) is decreased as a result of the presence of a large number of acetate groups. In addition, the acetate group is not very satisfactory in conferring solubility on the final polymer in those aromatic or halogenated solvents which are normally employed in the preparation of light-sensitive coatings. Accordingly, there is a need for a simple process for preparing soluble poly(vinyl esters) from high molecular weight acid chlorides without decreasing the light sensitivity of the poly(vinyl ester), while retaining good solubility in the coating solvents normally employed in the preparation of light-sensitive coatings.

Accordingly, it is an object of this invention to provide a novel method for the preparation of poly(vinyl esters) from high molecular weight acid chlorides.

It is a further object of this invention to provide a novel process for the preparation of soluble poly(vinyl esters).

It is still a further object of this invention to prepare soluble light-sensitive poly(vinyl esters) by a novel procedure.

The above and other objects of this invention will become apparent to those skilled in the art from the further description of this invention which follows.

In accordance with the present invention it has been found that pretreatment of a suspension of poly(vinyl alcohol) with an amount of aroyl chloride sufficient to esterify from 10 to 35 percent of the hydroxyl groups in the poly(vinyl alcohol) yields a material which can then be readily reacted with high molecular weight acid chlorides to yield soluble poly(vinyl esters). Thus, the present invention comprises esterifying from about 10 to about 35 percent of the free hydroxyl groups of a poly(vinyl alcohol) with an aroyl chloride and then esterifying the aroylated poly(vinyl alcohol) with a high molecular weight acid chloride. Optionally, any remaining free hydroxyl groups can be then esterified with an additional amount of aroyl chloride.

In a typical procedure for practicing the present invention, a suspension of poly(vinyl alcohol) is formed in a tertiary amine solvent, such as pyridine, 2-, 3- or 4-picoline, 2,4- or 2,6-lutidine, N-methylpyrrole, N-methylpyrrolidine, N,N-dimethylaniline, triethylamine, etc. Since the amine solvent should be a good solvent for the final polymer, cyclic tertiary amines are preferred over aliphatic tertiary amines. This suspension can then be heated to swell the poly(vinyl alcohol), and the suspension is then reacted with sufficient aroyl chloride to esterify from about 10 to 35 percent of the free hydroxyl groups in the poly(vinyl alcohol). Heating of the poly(vinyl alcohol) suspension is desirable since the swollen poly(vinyl alcohol) will react more rapidly with the aroyl chloride than an unswollen poly(vinyl alcohol). However, such heating is not necessary since the aroyl chloride will swell and will react with a poly(vinyl alcohol) which has not been heated, although the reaction will take somewhat longer. This pretreatment to yield a partially aroylated material does not always result in the formation of a homogeneous reaction mixture. However, the product does have sufficient solubility, or is sufficiently swollen, so that reaction with the high molecular weight acid chloride readily takes place to yield a soluble poly(vinyl ester). While amounts of aroyl chloride in excess of that required to aroylate up to 35 percent of the free hydroxyl groups will yield a homogeneous reaction mixture, it is undesirable to use such large amount since the remaining free hydroxyl groups have been found to be deactivated, most likely because of steric crowding.

The partially aroylated poly(vinyl alcohol) is then reacted with a high molecular weight acid chloride to form the desired soluble poly(vinyl ester). Esterification of any remaining free hydroxyl groups with an additional amount of aroyl chloride, while not necessary, is desirable since the presence of free hydroxyl groups has been found to decrease the solubility of the poly(vinyl ester) to a certain extent and, with those polymers which contain light-sensitive moieties, the presence of such free hydroxyl groups has been found detrimental to the light sensitivity of the polymer.

When the amount of aroyl chloride added is less than the amount necessary to esterify about 35 percent of the hydroxyl groups of the polymer, its reactivity is such that substantially all of the aroyl chloride will react with free hydroxyl groups. Thus, addition of the theoretical amount of aroyl chloride is generally adequate to obtain the desired degree of esterification. If desired, the degree of esterification of the aroylated poly(vinyl alcohol) can be determined by ultraviolet spectroscopic analysis to determine its carbonyl, or ester, content.

The poly(vinyl alcohol) which is esterified by the procedure of the present invention can contain 100 percent free hydroxyl groups, or a small percentage of these free hydroxyl groups can be esterified with acetate groups. Up to 25 percent acetate groups can be contained in the poly(vinyl alcohol) without having a significant detrimental effect upon the reactivity of the poly(vinyl alcohol) or the light sensitivity of the poly(vinyl ester) prepared therefrom. The amount of aroyl chloride employed to confer solubility on the partially acetylated poly(vinyl alcohol) is the same as that used for a poly(vinyl alcohol) which does not contain any acetate groups. Thus, when I speak of aroylating up to 35 percent of the free hydroxyl groups of a poly(vinyl alcohol), I am referring to the maximum number of hydroxyl groups which the polymer can theoretically contain.

The poly(vinyl alcohols) which are used in the practice of the present invention are commercially available materials and can vary in molecular weight, viscosity, degree of hydrolyzation and the like. A highly suitable group of poly(vinyl alcohols) are sold by E. I. du Pont de Nemours Company under the trademark "Elvanol."

The present invention can be practiced with hydroxyl containing polymers other than poly(vinyl alcohol). Such other polymers include cellulose polymers such as hydroxyethyl cellulose and epoxy polymers such as the condensation product of bisphenol A and epichlorohydrin. However, these other polymers generally do not present the same solubility problems as does poly(vinyl alcohol), so that while the procedure of the present invention is useful in preparing polyesters of these other hydroxyl containing polymers, this procedure is not necessary to obtain a soluble polyester.

Aroyl chlorides which are useful in aroylating poly(vinyl alcohol) in accordance with the present invention can be depicted by the following structural formula:

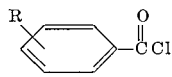

wherein R is a hydrogen atom; an alkyl group of one to eight carbon atoms, such as methyl, ethyl, propyl, n-butyl, n-amyl, n-heptyl, n-octyl, etc.; or an alkoxy group of one to eight carbon atoms, such as methoxy, ethoxy, propoxy, n-butoxy, n-amyloxy, n-hexoxy, n-heptoxy, n-octyloxy, etc. Typical aroyl chlorides which are suitable for use in this invention include benzoyl chloride, p-toluoyl chloride, m-toluoyl chloride, p-ethylbenzoyl chloride, p-amyloxybenzoyl chloride, p-octylbenzoyl chloride, p-anisoyl chloride, p-ethoxybenzoyl chloride, p-heptoxybenzoyl chloride and the like.

While the procedure of the present invention can be employed to prepare esters of poly(vinyl alcohol) from any acid chloride, it is especially useful for preparing poly(vinyl esters), in particular light-sensitive poly(vinyl esters), from high molecular weight acid chlorides which otherwise would yield insoluble polymers. Since the number and variety of acid chlorides which would otherwise yield insoluble polymers is so diverse, no simple structural formula can be given which would encompass all of the acid chlorides with which the present invention can be employed to prepare soluble poly(vinyl esters). Similarly, since substituents on the acid chloride, such as chloro groups or nitro groups, affect the solubility of the poly(vinyl ester), a single molecular weight cannot be given above which the process of the present invention must be employed to obtain a soluble poly(vinyl ester) and below which soluble poly(vinyl esters) can be obtained by other esterification procedures.

However, there are two simple tests with which those skilled in the art can determine whether or not the process of the present invention is useful to prepare soluble poly(vinyl esters) from high molecular weight acid chlorides. The first test is based upon the melting point of the acid chloride, since the solubility of the resultant poly(vinyl ester) is related to the melting point of the acid chloride from which it is prepared. It has been found that those acid chlorides which melt above about 130° C. generally will give insoluble poly(vinyl esters) if prepared by standard esterification procedures. However, if prepared by the procedure of the present invention, soluble poly(vinyl esters) are obtained.

The second test is based upon the effect which the acid chloride has upon a suspension of poly(vinyl alcohol) in a solvent such as pyridine. It has been found that if, upon addition of the high molecular weight acid chloride to a suspension of poly(vinyl alcohol) in pyridine, the poly(vinyl alcohol) is swollen, then the resultant poly(vinyl ester) will be soluble. However, if addition of the acid chloride does not swell the poly(vinyl alcohol), then standard procedures will generally yield an insoluble esterification product.

Thus, the procedure of the present invention is extremely useful for preparing soluble poly(vinyl esters) from relatively high molecular weight acid chlorides which melt above about 130° C. and which will not swell a suspension of poly(vinyl alcohol) in pyridine.

Representative high molecular weight acid chlorides from which soluble poly(vinyl esters) can be prepared by the procedure of this invention include cinnamoyl chlorides such as 4-(2-cyanocarbethoxyvinyl)cinnamoyl chloride, 4-[2-(4-amyloxybenzoyl)vinyl]cinnamoyl chloride, 4-[2-(benzoyl)vinyl]cinnamoyl chloride, 4-[3-(ethylhexoxycarbonyl)-1-indenylidenemethyl]cinnamoyl chloride, 4-[2-(4 - β-hydroxyethoxybenzoyl)vinyl]cinnamoyl chloride; benzoyl chlorides such as 4 - [2 - (benzoyl)vinyl] benzoyl chloride; acryloyl chlorides such as 2-(5-styrylfuran-2-yl)acryloyl chloride, β-ethoxycarbonyl-β'-chloroformyl-divinyl benzene; cyclohexadiene carbonyl chlorides such as 1-methoxycarbonyl - 4 - chloroformyl-1,3-cyclohexadiene; indenecarbonyl chlorides such as 1-benzylidene-3-indenecarbonyl chloride, 1-p-nitrobenzylidene-3-indenecarbonyl chloride; and the like. While these acid chlorides will give light-sensitive poly(vinyl esters), it will be apparent to those skilled in the art that this procedure is of equal utility with high molecular weight acid chlorides which do not give light-sensitive poly(vinyl esters).

The light-sensitive poly(vinyl esters) prepared by the procedure of the present invention are photohardenable or photoinsolubilizable and find utility in such applications as the preparation of lithographic printing plates, photoresists, and other photographic applications for which light-sensitive resins are generally employed. The non-light-sensitive poly(vinyl esters) which are prepared according to the procedure of the present invention can be employed as protective coatings or films, adhesives, binders, and for other purposes for which poly(vinyl alcohol) and its esters have found utility.

The following examples further illustrate the practice of the present invention.

EXAMPLE 1

A mixture of 1 g. (0.02 mole) of a medium molecular weight poly(vinyl alcohol) containing 12 percent acetate groups (Elvanol 52–22 sold by Du Pont) and 25 ml. of pyridine is heated on a steam bath for 4 hours to partially swell the polymer. The mixture is cooled to room temperature, 0.7 ml. of benzoyl chloride is added and the mixture is stirred and heated at 50° C. for 1 hour. To the reaction mixture is added 1.2 g. (0.04 mole) of 4-(2-cyano-2-carbethoxyvinyl)cinnamoyl chloride and the heating and stirring are continued for an additional 2 hours. After an additional 1.5 ml. of benzoyl chloride is added and the mixture is stirred another hour, the clear dope is precipitated into water and the polymer is thoroughly washed with water and dried to give 2.2 g. of solid material. The product is readily soluble in solvents such as cyclohexanone, trichloroethane and N,N-dimethylformamide.

*Analysis.*—Calcd. (percent): C, 68.3; H, 5.8; N, 1.9. Found (percent): C, 67.6; H, 5.8; N, 2.0.

EXAMPLE 2

A mixture of 1 g. of the poly(vinyl alcohol) used in Example 1 and 25 ml. of pyridine is heated on the steam bath for 4 hours. The mixture is cooled and 1.2 g. of 4-(2 - cyano - 2 - carbethoxyvinyl)cinnamoyl chloride is added. The reaction mixture is stirred at 50° C. for 2 hours, but a clear dope does not form. After 2 ml. of benzoyl chloride is added, the mixture is stirred for an additional 2 hours at 50° C. The reaction mixture at this point has completely gelled, and the product is not soluble in cyclohexanone, trichloroethylene or N,N-dimethylformamide. This demonstrates that preliminary aroylation is necessary for a soluble polymer to be obtained.

EXAMPLE 3

One gram of the poly(vinyl alcohol) used in Example 1 is swelled in 25 ml. of hot pyridine and 0.92 ml. of benzoyl chloride is added. The reaction mixture is stirred at 50° C. for 1 hour and 1.9 g. of 4-[2-(4-amyloxybenzoyl)vinyl]cinnamoyl chloride is added and the heating and stirring are continued for 2 hours. To the resulting clear dope is added 1 ml. of benzoyl chloride and the heating and stirring are continued for an hour. The polymer is precipitated into water and after thoroughly washing and drying, 2.7 g. of soluble polymer are obtained. If the substituted cinnamoyl chloride is added first, followed by benzoyl chloride, an insoluble polymer is obtained.

EXAMPLE 4

A mixture of 0.88 g. (0.02 mole) of a completely hydrolyzed (99–100 percent), high molecular weight poly(vinyl alcohol) Elvanol 72–60 sold by Du Pont), and 25 ml. of dry pyridine is heated with stirring on a steam bath for 3 hours to swell the polymer. The mixture is cooled to 50° C. and 1.5 g. (1.25 ml., 0.017 mole) of benzoyl chloride is added. The reaction mixture is stirred and heated at 50° C. for 2 hours, then 1.5 g. (0.5 mole) of 4-(2-benzoylvinyl)cinnamoyl chloride is added and the heating and stirring are continued an additional 3 hours. The clear dope is precipitated into 1 liter of water, the polymer is collected by filtration, washed with 3 fresh portions of water, and dried in a vacuum oven at room temperature. The yield of polymer is 2.73 g. Attempting to prepare this polymer by first adding the light-sensitive moiety to the reaction mixture produces an insoluble polymer.

EXAMPLE 5

A mixture of 5 g. (0.1 mole) of the poly(vinyl alcohol) used in Example 1, and 100 ml. of pyridine is stirred and heated on a steam bath for 2 hours. p-Anisoyl chloride (4.3 g., 0.025 mole) is then added and stirring and heating are continued for 1 hour. The mixture is cooled to 50° C., 10 g. (0.0338 mole) of 4-(2-benzoylvinyl)cinnamoyl chloride is added, and stirring and heating at 50° C. are continued another 2 hours. A further 6 g. of p-anisoyl chloride is added to the reaction mixture and after an additional hour of heating and stirring, the clear dope is precipitated into water. The polymer is collected by filtration, washed with 3 fresh portions of water and dried in vacuo to give 18.1 g. of product.

EXAMPLE 6

This preparation is carried out in accordance with the procedure of Example 5 using 5.7 g. of p-amyloxybenzoyl chloride, 10 g. of the light-sensitive acid chloride, and finally an additional 7 g. of 4-amyloxybenzoyl chloride. The yield of polymer is 18.5 g.

EXAMPLE 7

This preparation is carried out in accordance with the procedure of Example 5 using 3.9 g. of p-toluoyl chloride, 10 g. of the light-sensitive acid chloride, and finally an additional 5 g. of p-toluoyl chloride. The yield of polymer is 18 g.

EXAMPLE 8

A swelled mixture of 5 g. of a low molecular weight, 12 percent acetylated poly(vinyl alcohol) (Elvanol 51–05 sold by Du Pont) in 100 ml. of pyridine is treated with 5 ml. of benzoyl chloride and the mixture is stirred at 50° C. for 1 hour. After 15 g. of 4-[2-(benzoyl)vinyl]cinnamoyl chloride is added, the mixture is stirred at 50° C. for 2 hours and then 7 ml. more benzoyl chloride is added. The reaction mixture is stirred a final hour at 50° C. and precipitated into water to yield 22 g. of soluble polymer. An insoluble polymer is obtained when the light-sensitive component is added first.

EXAMPLE 9

A soluble polymer is prepared as described in Example 3, except 4-(2-benzoylvinyl)benzoyl chloride is used in place of 4-[2-(4-amyloxybenzoyl)vinyl]cinnamoyl chloride. The product is soluble in aromatic and chlorinated solvents such as are useful in coating light-senstive materials. The polymer obtained by adding the light-sensitive acid chloride first and then benzoyl chloride is insoluble in the reaction medium and in organic solvents.

EXAMPLE 10

A soluble polymer is prepared as described in Example 3 using 2-(5-styrylfuran-2-yl)acryloyl chloride as the light-sensitive moiety. The polymer obtained by this procedure is soluble in organic solvents whereas the product obtained when the substituted acryloyl chloride is added first is not soluble.

EXAMPLE 11

A mixture of 5 g. (0.1 mole) of Elvanol 52–22 and 150 ml. of pyridine is heated overnight on a steam bath to swell the polymer. The mixture is cooled to room temperature, 3.5 g. (0.025 mole) of benzoyl chloride is added and the mixture is stirred at 50° C. for 1 hour. After adding 9.5 g. (0.027 mole) of methyl 1-[4-(2-chlorocarbonylvinyl)benzylidene]indene - 3 - carboxylate, the mixture is stirred for an hour at 50° C. to give a clear dope. To the dope is added 7 g. (0.05 mole) of benzoyl chloride, and the reaction mixture is stirred for a final hour at 50° C. The dope is poured into 3 liters of water and the liquid is decanted from the polymer and replaced with 3 liters of fresh water. After soaking overnight, the polymer is collected, dissolved in dichloromethane and precipitated into methanol to yield 15.5 g. of polymer. The reaction is repeated except that the indene derivative is added first to the pyridine suspension of poly(vinyl alcohol). A gel is obtained and the addition of benzoyl chloride to the reaction mixture does not give a soluble polymer even after stirring the mixture at 50° C. for 6 hours.

The invention has been described in detail with particular reference to preferred embodiments thereof, but it will be understood that variations and modifications can be effected within the spirit and scope of the invention.

What is claimed is:

1. A process for preparing soluble esters of poly(vinyl alcohol) with high molecular weight acid chlorides which comprises the steps of
   (a) esterifying 10 to 35 percent of the free hydroxyl groups of a poly(vinyl alcohol) with an aroyl chloride which has the structural formula:

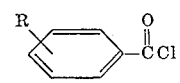

wherein R is selected from the group consisting of hydrogen atoms, alkyl groups of 1 to 8 carbon atoms, and alkoxy groups of 1 to 8 carbon atoms, and
   (b) esterifying the resulting aroylated poly(vinyl alcohol) with a high molecular weight acid chloride which melts above 130° C., which does not swell a suspension of poly(vinyl alcohol) in pyridine and which would result in an insoluble ester of polyvinyl alcohol if the polyvinyl alcohol had not been aroylated as in step (a).

2. A process for preparing soluble esters of poly(vinyl alcohol) as defined in claim 1 which further comprises the step of
(c) reacting the product of step (b) with an additional amount of an aroyl chloride to esterify any remaining free hydroxyl groups.

3. A process for preparing soluble esters of poly(vinyl alcohol) from high molecular weight acid chlorides which comprises the steps of
(a) forming a suspension of a poly(vinyl alcohol) in a tertiary amine solvent,
(b) esterifying 10 to 35 percent of the free hydroxyl groups of the poly(vinyl alcohol) with an aroyl chloride which has the structural formula:

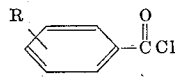

wherein R is selected from the group consisting of hydrogen atoms, alkyl groups of 1 to 8 carbon atoms, and alkoxy groups of 1 to 8 carbon atoms, and
(c) esterifying the resulting aroylated poly(vinyl alcohol) with a high molecular weight acid chloride which melts above 130° C., which does not swell a suspension of poly(vinyl alcohol) in pyridine and which would result in an insoluble ester of poly(vinyl alcohol) if the poly(vinyl alcohol) had not been aroylated as in step (a).

4. A process for preparing soluble esters of poly(vinyl alcohol) as defined in claim 3 which further comprises the step of
(d) reacting the product of step (c) with an additional amount of an aroyl chloride to esterify any remaining free hydroxyl groups.

5. A process for preparing soluble esters of poly(vinyl alcohol) as defined in claim 3 wherein the tertiary amine solvent is pyridine.

6. A process for preparing soluble esters of poly(vinyl alcohol) as defined in claim 3 wherein the poly(vinyl alcohol) contains up to 25 percent of acetate groups.

7. A process for preparing soluble light sensitive esters of poly(vinyl alcohol) as defined in claim 3 wherein the high molecular weight acid chloride is an ethylenically unsaturated acid chloride.

8. A process for preparing soluble esters of poly(vinyl alcohol) as defined in claim 7 wherein the high molecular weight acid chloride is selected from the group consisting of cinnamoyl chlorides, benzoyl chlorides, acryloyl chlorides, cyclohexadiene carbonyl chlorides, and indenecarbonyl chlorides, which have melting points above about 130° C.

9. A process for preparing soluble esters of poly(vinyl alcohol) as defined in claim 3 wherein the aroyl chloride is selected from the group consisting of benzoyl chloride, p-anisoyl chloride, p-toluoyl chloride, and p-amyloxybenzoyl chloride.

10. A process for preparing soluble esters of poly(vinyl alcohol) from high molecular weight acid chlorides which comprises the steps of
(a) forming a suspension of a poly(vinyl alcohol) in pyridine,
(b) esterifying 10 to 35 percent of the free hydroxyl groups of the poly(vinyl alcohol) with benzoyl chloride,
(c) esterifying the resulting aroylated poly(vinyl alcohol) with a high molecular weight acid chloride selected from the group consisting of cinnamoyl chlorides, benzoyl chlorides, acryloyl chlorides, cyclohexadiene carbonyl chlorides, and indenecarbonyl chlorides, which have melting points above about 130° C. and which would result in an insoluble ester of poly(vinyl alcohol) if the poly(vinyl alcohol) had not been aroylated as in step (a), and
(d) esterifying any remaining free hydroxyl groups contained in the poly(vinyl alcohol) with an additional amount of benzoyl chloride.

References Cited
UNITED STATES PATENTS

| | | | |
|---|---|---|---|
| 2,269,187 | 1/1942 | D'Alelio | 260—87 |
| 2,725,372 | 11/1955 | Minsk | 260—91.3 |
| 3,257,664 | 6/1966 | Leubner et al. | |

JOSEPH L. SCHOFER, Primary Examiner

S. M. LEVIN, Assistant Examiner

U.S. Cl. X.R.
260—47, 89.1, 230